Feb. 9, 1971  J. R. HALL  3,561,217
LIQUID AIR ENGINE CYCLE WITH RELIQUEFACTION
Filed Jan. 25, 1961
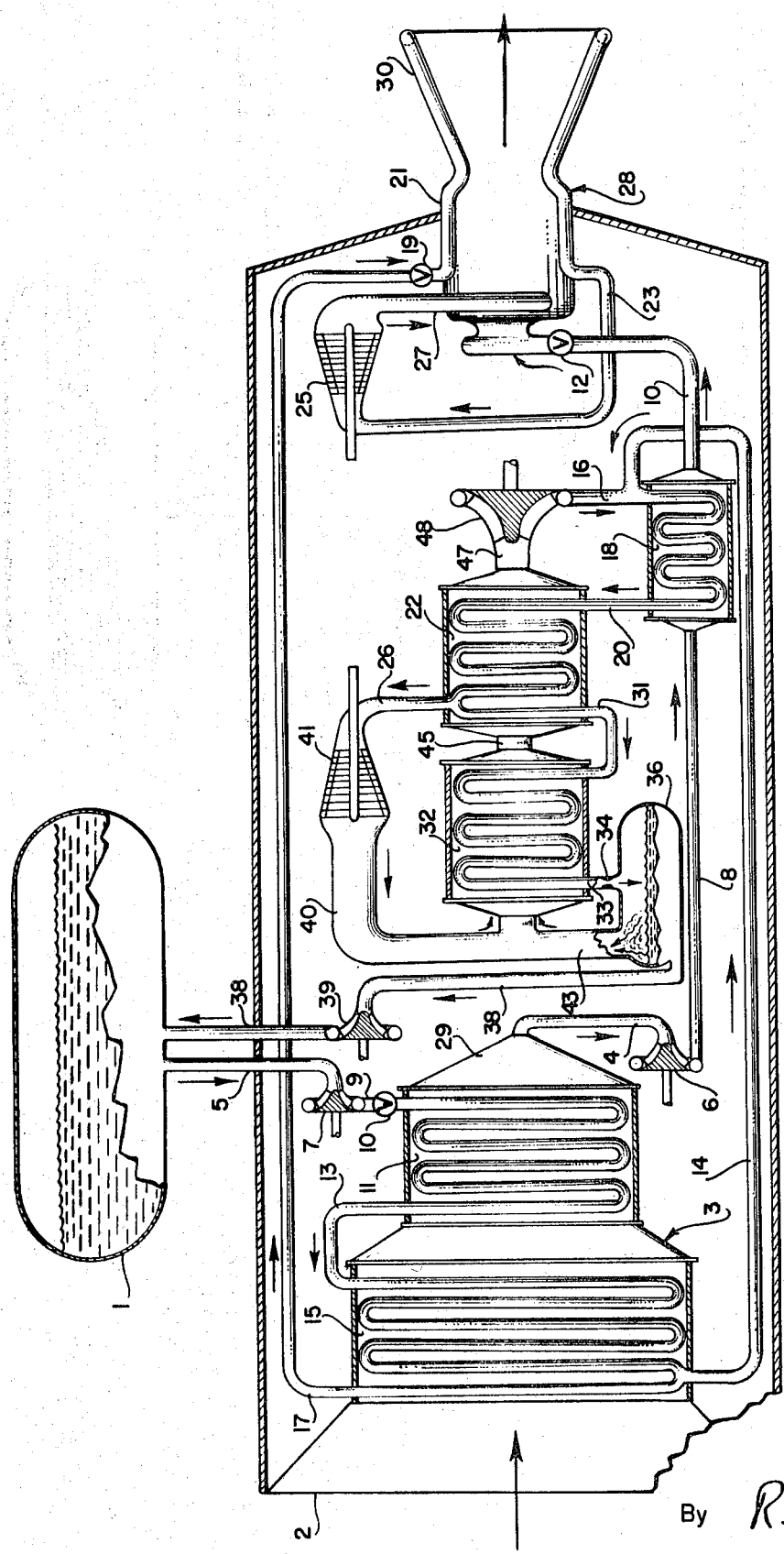
INVENTOR.
JAMES R. HALL
By *R. E. Geauque*
Attorney

United States Patent Office 3,561,217
Patented Feb. 9, 1971

3,561,217
LIQUID AIR ENGINE CYCLE WITH RELIQUEFACTION
James R. Hall, Sepulveda, Calif., assignor to The Marquardt Corporation, Van Nuys, Calif., a corporation of California
Filed Jan. 25, 1961, Ser. No. 84,889
Int. Cl. B63h 11/00
U.S. Cl. 60—204          6 Claims This invention relates to a liquid air engine cycle with reliquefaction, and more particularly to an engine employing a cryogenic liquid fuel which is used to liquefy air prior to combustion with the air, and employing a reliquefier which conserves the fuel in such a manner as to result in an engine of considerably lower specific fuel consumption.

In prior engines, fuel in the form of low temperature liquefied gas has been utilized to liquefy air, and thereafter the fuel is combusted and expanded with the air to produce jet propulsive thrust. Such engines employ heat exchangers for liquefying the air with the cryogenic fuel and also utilize pumping means to pressurize the liquid air and liquid fuel. The fuel and air can be burned in a suitable combustion thrust chamber for producing the engine output thrust. In conventional air-breathing jet propulsion engines, such as turbojets and ramjets, it is generally desirable to utilize in the combustion chamber a fuel/air ratio equal to or less than the chemical stoichiometric value in order to achieve the lowest values of specific fuel consumption for the engine. On the other hand, for jet propulsion engines utilizing liquid hydrogen as fuel and to liquefy air, it is an inherent and fundamental feature of such engines that the fuel/air ratio required to achieve liquefaction of air in the engine's heat exchanger is several times greater than that desired for operation in the engine's combustion chamber. Thus, in order to meet the requirements of fuel/air as set by the heat exchanged, the combustion chamber must accept a large excess of fuel which cannot be burned with a given air flow. It is, therefore, obvious that under such operating conditions, the specific fuel consumption of the engine is much greater than desired. This so-called incompatibility of fuel/air ratio which exists between the engine's heat exchanger and the thrust chamber is due to the change of state conditions for air within the heat exchanger at air incipient liquefaction. At the point of incipient air liquefaction a so-called "pinch point" effect occurs between the temperature difference of the air and the hydrogen, which in effect requires a larger hydrogen/air ratio to permit "getting by" such a point with a reasonable temperature difference of the air and hydrogen. If the larger fuel/air ratios to get by the pinch point were not employed in the region of the pinch point, the direction of heat transfer from the air to the hydrogen would terminate because of equal temperatures of the two fluids at two points on either side of the pinch point for a given air pressure and hydrogen/air ratio. A further description of this pinch point phenomenon is found in application Ser. No. 88,163, entitled "Liquid Air Jet Propulsion Engine and Method of Operation" Pat. No. 3,452,541, patented July 1, 1969.

The present invention proposes a liquid air engine cycle wherein the required hydrogen/air ratio is utilzed in the heat exchanger to achieve air liquefaction and the ratio is thereafter reduced to any desired fuel/air ratio for the combustion chamber. In other words, with the present invention, the heat exchanger no longer establishes the fuel /air ratio for the thrust chamber of the engine. The reduction in specific fuel consumption, resulting from a proper fuel/air ratio in the thrust chamber, is achieved by dividing the hydrogen flow leaving the heat exchanger, and introducing to the thrust chamber only the amount of hydrogen required by the combustion chamber for the desired fuel/air ratio. The amount of excess hydrogen split off from that flowing to the combustion chamber is considerably greater than that which is consumed and thus, a sizeable reduction in consumed fuel will result for a given engine air flow. Consequently, the specific fuel consumption of the engine will be greatly reduced. All the hydrogen leaving the heat exchanger will be in the superheated vapor state and at an elevated temperature since it will have absorbed heat from the incoming gaseous air. In order to restore the excess hydrogen not used in the engine to its original heat sink capacity for re-use as a coolant in the heat exchanger, the excess hydrogen is transferred to a suitable plant for effecting the reliquefaction of the hydrogen. By such means, the operation of the heat exchanger and the combustion chamber can function independently in regards to the fuel/air ratio of each.

It is, therefore, an object of the present invention to provide a liquid air engine cycle providing a fuel/air ratio in the engine's heat exchanger which is independent of that set for the engine's combustion chamber.

Another object of the invention is to provide a liquid air engine having a supply of liquid hydrogen which is utilized to liquefy air, a part of the hydrogen discharged from the liquefaction process being combusted in the engine and another part being reliquefied.

Another object of the present invention is to provide a liquid air jet propulsion engine in which the engine's specific fuel consumption is appreciably reduced by decreasing the consumed fuel to only that required of the engine's combustion chamber.

Another object of the invention is to provide a method of operating a liquid air engine to obtain low specific fuel consumption while also being capable of producing liquid air.

A further object of the invention is to provide a liquid air jet propulsion engine in which flexibility of operation of the heat exchanger is achieved through the use of a semi-independent circuit of working fluid from that utilized in the combustion chamber, such flexibility achieving optimum engine performance over a wide variety of encountered flight conditions.

These and other objects of the invention not specifically set forth above will become apparent from the accompanying description and from the drawing which is a diagrammatic illustration of the invention showing the air liquefaction system and the hydrogen reliquefaction system.

Referring to the drawing, a fuel supply tank 1 contains liquid hydrogen which is connected to a liquid hydrogen pump 7 by passage 5. The discharge of pump 7 is connected by passage 9 through valve 10 to the condenser section 11 of heat exchanger 3, wherein the air received from the inlet 2 is fully liquefied by counterflow with the cold liquid hydrogen. The hydrogen discharge of condenser section 11 is connected to the air pre-cooler 15 of heat exchanger 3 by passage 13. At a suitable point at the discharge end of the pre-cooler, the hydrogen flow passage is divided to permit a split flow of the hydrogen thereafter. Hydrogen required by the engine as fuel for the combustion chamber 28 leaves pre-cooler 15 by passage 17 which is connected to the cooling jacket 21 of thrust chamber 28 through flow control valve 19. Passage 23 connects the discharge end of cooling jacket 21 to hydrogen vapor power turbine 25 and passage 27 connects the exhaust of the turbine to appropriate injection nozzle means (not shown) for burning the hydrogen in combustion chamber 28.

The hydrogen flow not required as fuel in the combustion chamber leaves the heat exchanger pre-cooler 15 through a passage 14 which joins with passage 16 and the total flow in passages 14 and 16 enters heat exchanger 18. The combined hydrogen flow leaves heat exchanger 18 through passage 20, which is connected to heat exchanger 22. At the exit of heat exchanger 22, the hydrogen flow is divided so that a portion passes to the turbo-expander 41 through passage 26 and the remainder passes to heat exchanger 32 through passage 31. The exit of heat exchanger 32 is connected to liquid hydrogen reservoir 36 by passage 33, which contains a Joule-Thomson valve 34 for accomplishing the desired type of thermodynamic expansion of hydrogen vapor therein. Connected to reservoir 36 is liquid hydrogen passage 38 leading to the liquid hydrogen tank 1 through a pump 39. A passage 43 is located to collect uncondensed hydrogen vapor from reservoir 36 and the passage joins with passage 40 from turbo-expander 41, in order to conduct cold hydrogen vapor as coolant in a counterflow fashion through heat exchanger 32, passage 45 and heat exchanger 22. Passage 47 connects the exhaust of heat exchanger 22 to the entrance of hydrogen vapor compressor 48. The discharge of compressor 48 connects with passage 16, which as previously mentioned, joins with passage 14 to permit flow from both passages to enter heat exchanger 18.

Inlet air duct 2 is connected to pre-cooler 15 of heat exchanger 3, and condenser 11 is attached to the aft portion of the pre-cooler. Liquid air collector 29 is attached at the rear of condenser 11 and connects with passage 4 which leads to liquid air pump 6. The discharge from pump 6 is introduced to heat exchanger 18 through passage 8 and the exit end of exchanger 18 is connected with an oxidizer injector (not shown) for thrust chamber 28 through passage 10 containing flow control valve 12.

In operation of the engine, liquid hydrogen from tank 1 is pumped to a pressure of several hundred pounds per square inch by pump 7 so that the hydrogen is above its critical pressure. The quantity of liquid hydrogen flowing from the pump 7 to condenser 11 can be controlled by valve 10 to that required to completely liquefy all of the air in condenser 11. After leaving the condenser 11, the somewhat warmed hydrogen passes to the heat exchanger pre-cooler 15, where the hydrogen coolant reduces the air temperature to that near the point of incipient air liquefaction at the rear of pre-cooler 15. After rendering the desired cooling effect upon the air, the hydrogen flow is then divided. In accordance with the thrust level demand for the engine, an appropriate quantity of the hydrogen leaving pre-cooler 15 is transmitted to the thrust chamber 28 by passage 17 as fuel to be burned with the air as oxidizer. The mass flow of hydrogen in passage 17 is therefore so regulated by valve 19 and valve 10 to provide the proper fuel flow to thrust chamber 28 for any and all power level settings of the engine. Since the total quantity of hydrogen required for fully liquefying the entire air mass flow in the heat exchanger is always greater than that required in the combustion chamber, an excess of heated hydrogen vapor will be leaving pre-cooler 15. For instance, under certain conditions a hydrogen-to-air ratio of 7 to 8 times stoichiometric could be required in the heat exchanger to achieve complete air liquefaction while a hydrogen-to-air ratio of stoichiometric or less is desirable in the combustion chamber.

Therefore, the excess hydrogen flow, while not needed for combustion, is required, in addition to that burned, for air liquefaction. Once the air liquefaction process is completed, the excess hydrogen vapor is reliquefied, by proper refrigeration means, and reused as a coolant in the heat exchanger. Thus, in effect, a semi-closed cycle refrigerator employing hydrogen as a working fluid is used to liquefy the air. A portion of hydrogen required for combustion is permanently removed from tank 1 and the remaining portion is reliquefied and returned to tank 1 to contribute further cooling capacity. This combusted portion of the hydrogen is withdrawn from the cycle at pre-cooler 15 and the hydrogen flow in passages 14 and 38 continues to circulate in a closed cycle fashion. While FIG. 1 shows the hydrogen for reliquefaction in passage 14 leaving pre-cooler 15 at a forward point, passage 14 may be tapped into the ducting of the pre-cooler at any suitable point, for instance, at the rear of the pre-cooler or from passage 13 ahead of the condenser 11. The various air heat loads associated with different flight conditions would establish such design considerations.

The quantity of hydrogen vapor to be reliquefied flows through passage 14, which joins passage 16 to permit mixing the two streams prior to entering heat exchanger 18. Since the temperature of the liquefied air in passage 8 will be considerably below that of the hydrogen vapor leaving pre-cooler 15, a cooling of the hydrogen passing through heat exchanger 18 will occur. Upon leaving heat exchanger 18, the cooled hydrogen vapor passes to heat exchanger 22, wherein the stream in passage 20 is further cooled by colder hydrogen vapor passing in counter flow fashion. At the exit of heat exchanger 22, the hydrogen flow is again divided, a portion passing to turbo-expander 41 by passage 26, and the remainder to heat exchanger 32, which further cools the vapor entering from passage 31. That portion of the hydrogen vapor leaving heat exchanger 32 via passage 33 is, of course, quite cold and under a relatively high pressure. Therefore, when hydrogen vapor in this condition is permitted to expand in the Joule-Thomson valve 34, hydrogen liquefaction occurs. The resulting liquid is collected in reservoir 36, and is then passed through passage 38 by pump 39 to tank 1 to repeat the cooling cycle. Meanwhile the energy removed from the hydrogen stream passing through turbo-expander 41 will lower the temperature of the vapor in passage 40 to that near the vapor temperature leaving reservoir 36 and flowing in passage 43. The two very cold hydrogen vapor streams in passages 40 and 43 join, and then pass into the cold side of heat exchanger 32 for cooling the hydrogen vapor entering heat exchanger 32 from passage 31. The mixed vapor streams continue through passage 45 to heat exchanger 22 and out through passage 47. To provide the hydrogen closed cycle circuit with a suitable working pressure for expansion in turbine 41 and valve 34, a hydrogen vapor compressor 48 is employed. It is understood that the output pressure of compressor 48 in passage 16 is such as to be compatible with the hydrogen vapor entering passage 16 from passage 14, before entering heat exchanger 18. Furthermore, the pressure ratio of the hydrogen vapor across turbo-expander 41 is so regulated that no hydrogen condensation occurs in the exhaust passage 40. The primary function of turbine 41 is to remove sufficient heat from the vapor stream in passage 26 to make the exhaust condition approach that of saturated vapor without producing liquid hydrogen. Conditions in the reliquefaction plant are so adjusted that hydrogen liquefaction occurs only at the expansion valve 34.

As in conventional liquid hydrogen-oxygen rocket practice, fuel led to the engine, such as in passage 17, is first used as a coolant for the thrust chamber walls in jacket 21. The resulting heated, high pressure hydrogen vapor leaving jacket 21 passes through passage 23 and is then expanded through power turbine 25, from which it passes into the combustion chamber 28 via passage 27. The shaft power output of turbines 41 and 25 are so arranged as to meet the power requirements of pumps 6, 7 and 39 and compressor 48.

By the present invention, a novel method and apparatus has been provided which permits a large reduction in the specific fuel consumption of engines of the liquid air cycle type. It is understood that other cryogenic fuels can be utilized and that various other arrangements of the hydrogen reliquefying plant are contemplated for producing liquid hydrogen at a minimum power consumption as well as with weight and bulk. Various other modifications are contemplated by those skilled in the art without departing from the spirit and scope of the invention as hereinafter defined by the appended claims.

What is claimed is:

1. A method of operating a liquid air engine to obtain low specific fuel consumption comprising the steps of:

storing low temperature liquid hydrogen as fuel;

passing said hydrogen under pressure through a heat exchanger in heat exchange relationship with incoming air to liquefy all the air while vaporizing the hydrogen;

controlling the hydrogen-to-air ratio in the heat exchanger at a high enough value to always maintain the hydrogen at a lower temperature than the air passing through its point of incipient liquefaction;

passing a portion of the hydrogen discharged from the heat exchanger to a propulsion means for combustion therein;

controlling the magnitude of said portion to maintain the hydrogen-to-air ratio in the propulsion means of about stoichiometric;

passing the remaining portion of hydrogen discharged from the heat exchanger through a reliquefaction cycle to reliquefy same for further use in the heat exchanger; and connecting the liquid air produced by the heat exchanger with the propulsion means for use as an oxidant for the hydrogen;

the reliquefaction cycle including the steps of cooling the remaining portion of hydrogen with the liquid air passing to the propulsion means, and expanding the remaining portion after cooling to reliquefy a part thereof.

2. A method of operating a liquid air engine to obtain low specific fuel consumption comprising the steps of:

storing low temperature liquid hydrogen as fuel;

passing said hydrogen under pressure through a heat exchanger in heat exchange relationship with incoming air to liquefy all the air while vaporizing the hydrogen;

controlling the hydrogen-to-air ratio in the heat exchanger at a high enough value to always maintain the hydrogen at a lower temperature than the air passing through its point of incipient liquefaction;

passing a portion of the hydrogen discharged from the heat exchanger to a propulsion means for combustion therein;

controlling the magnitude of said portion to maintain a hydrogen-to-air ratio in the propulsion means of about stoichiometric;

passing the remaining portion of hydrogen discharged from the heat exchanger through a reliquefaction cycle to reliquefy same for further use in the heat exchanger; and connecting the liquid air produced by the heat exchanger with the propulsion means for use as an oxidant for the hydrogen;

the reliquefaction cycle comprising the steps of passing the remaining portion of hydrogen under pressure through a second heat exchanger in heat exchange relationship with the liquid air passing to the propulsion means and through a third heat exchanger in heat exchange relationship with hydrogen gas introduced at about its liquefaction temperature;

raising the hydrogen discharged from the third heat exchanger to a pressure corresponding to that of said remaining portion;

commingling the hydrogen of raised presssure with said remaining portion prior to introduction to the second heat exchanger;

withdrawing a portion of the hydrogen gas under pressure in the third heat exchanger and expanding same to about its liquefaction temperature and expanding the remaining hydrogen gas under pressure discharged from the third heat exchanger to liquefy a portion thereof, both portions of the expanded hydrogen gas obtained from the third heat exchanger being commingled before introduction to the third heat exchanger as the hydrogen gas at about liquefaction temperature.

3. An engine comprising:

a tank containing a supply of low temperature liquid hydrogen for use as fuel;

a heat exchanger connected with said tank for receiving the hydrogen as the coolant;

air passage means for introducing air to said heat exchanger for liquefaction by the hydrogen;

a combustion chamber;

first passage means for connecting a portion of the hydrogen discharged from said heat exchanger with said combustion chamber;

second passage means for connecting the liquid air produced by said heat exchanger to said combustion chamber;

hydrogen reliquefying means;

third passage means for connecting the remaining portion of the hydrogen discharged from said heat exchanger to said reliquefying means to reliquefy said remaining portion for reuse in the heat exchanger; and means for regulating the portion of fuel passing to said combustion chamber through said first passage means to provide a desired fuel/air ratio in said combustion chamber;

said reliquefying means comprising a second heat exchanger for cooling said remaining portion of hydrogen with the liquid air passing to said combustion chamber through said second passage.

4. An engine comprising:

a tank containing a supply of low temperature liquid hydrogen for use as fuel;

a heat exchanger connected with said tank for receiving the hydrogen under pressure as the coolant;

air passage means for introducing air to said heat exchanger for liquefaction by the hydrogen;

means for regulating the quantity of hydrogen supplied to said heat exchanger to maintain the hydrogen-to-air ratio in the heat exchanger at a high enough value to always maintain the hydrogen at a lower temperature than the air while passing through its point of incipient liquefaction;

a combustion chamber;

first passage means for connecting a portion of the hydrogen discharged from said heat exchanger with said combustion chamber;

means for controlling the quantity of said first portion supplied to said combustion chamber to maintain a hydrogen-to-air ratio in said combustion chamber at about stoichiometric;

second passage means for connecting the liquid air produced by said heat exchanger to said combustion chamber;

hydrogen reliquefying means; and third passage means for connecting the remaining portion of the hydrogen discharged from said heat exchanger to said reliquefying means to reliquefy said remaining portion for reuse in the heat exchanger;

said reliquefying means comprising a second heat exchanger for cooling said remaining portion of hydrogen with the liquid air passing to said combustion chamber through said second passage.

5. An engine as defined in claim 4 having:

a third heat exchanger utilizing low pressure hydrogen as the coolant;

means for raising the low pressure hydrogen discharged from the third heat exchanger to a pressure corresponding with the pressure of said remaining portion in said third passage;

means for commingling said discharged hydrogen of raised pressure with said remaining portion of hydrogen prior to introduction of said remaining portion to said second heat exchanger;

means for introducing the hydrogen under pressure discharged from said second heat exchanger to said third heat exchanger for cooling by said low pressure hydrogen coolant; and means for producing said low pressure hydrogen coolant along with liquid hydrogen by expanding hydrogen under pressure withdrawn from said third heat exchanger.

6. An engine as defined in claim 5 wherein said means for expanding the withdrawn hydrogen comprises an expansion turbine connected with said third heat exchanger means at an intermediate stage and an expansion valve located at the discharge end of said third heat exchanger, said liquid hydrogen being produced by said expansion valve.

References Cited
FOREIGN PATENTS 160,755    1/1942    Austria.
763,449    12/1956    Great Britain.

OTHER REFERENCES

Time Magazine, vol. LXXIV, No. 25, Dec. 21, 1959, Science Section, p. 37.

SAMUEL FEINBERG, Primary Examiner

U.S. Cl. X.R.

60—260, 39.46